(12) United States Patent
Hilmas et al.

(10) Patent No.: US 7,895,977 B2
(45) Date of Patent: Mar. 1, 2011

(54) DEVICE FOR THE SAFE HANDLING OF NONHUMAN PRIMATES

(75) Inventors: Corey J. Hilmas, Perryville, MD (US); Patrick Williams, New Castle, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 143 days.

(21) Appl. No.: 12/116,761

(22) Filed: May 7, 2008

(65) Prior Publication Data

US 2008/0276881 A1 Nov. 13, 2008

Related U.S. Application Data

(60) Provisional application No. 60/930,354, filed on May 10, 2007.

(51) Int. Cl.
*A01K 15/04* (2006.01)
(52) U.S. Cl. ............... 119/751; 119/752; 119/57.8; 43/60
(58) Field of Classification Search .......... 119/416, 119/417, 452, 482, 57.8, 52.2, 751, 752; 43/60, 65; 401/131; 220/836, 830, 827, 220/810, 326, 324, 315, 371, 367.1
See application file for complete search history.

(56) References Cited

U.S. PATENT DOCUMENTS

| | | | | | |
|---|---|---|---|---|---|
| 204,562 | A | * | 6/1878 | Gunther | 119/464 |
| 1,468,730 | A | * | 9/1923 | Oster | 119/462 |
| 1,963,414 | A | * | 6/1934 | Little | 119/463 |
| 2,778,333 | A | * | 1/1957 | Babros et al. | 119/463 |
| 2,789,531 | A | * | 4/1957 | Diefendorf | 119/461 |
| 2,914,022 | A | * | 11/1959 | Hinton | 119/463 |
| 3,683,857 | A | * | 8/1972 | Yellin | 119/461 |
| 3,815,549 | A | * | 6/1974 | Opmeer | 119/459 |
| 3,830,201 | A | | 8/1974 | Coulbourn | |
| 4,343,261 | A | | 8/1982 | Thomas | |
| 4,907,536 | A | | 3/1990 | Chrisler | |
| 5,000,121 | A | * | 3/1991 | Daily | 119/461 |
| 5,036,795 | A | * | 8/1991 | Houghton | 119/452 |
| 5,044,319 | A | * | 9/1991 | Blasbalg | 119/57.9 |
| 5,327,852 | A | * | 7/1994 | Gingrich | 119/453 |
| 5,826,545 | A | | 10/1998 | Steffes et al. | |
| 6,041,741 | A | | 3/2000 | Gabriel et al. | |
| D424,756 | S | * | 5/2000 | Huang | D30/119 |
| D467,043 | S | * | 12/2002 | Weiping | D30/119 |
| 6,516,750 | B1 | * | 2/2003 | Heinzeroth | 119/428 |
| 6,588,373 | B1 | | 7/2003 | Strzempko et al. | |
| 7,146,932 | B2 | * | 12/2006 | Willinger et al. | 119/461 |
| 7,234,269 | B2 | | 6/2007 | Yonker et al. | |

(Continued)

*Primary Examiner*—Timothy D Collins
*Assistant Examiner*—Joshua Huson
(74) *Attorney, Agent, or Firm*—Elizabeth Arwine

(57) ABSTRACT

A device for the safe handling of nonhuman primates includes a transparent elongated body having a top end and a bottom end. A ventilated lid is attached to the top end of the body by means of a hinge and includes a positive locking arrangement. The bottom end of the body is removably connected to a base which has first and second springs attached thereto. The body includes a plurality of apertures into which are positioned a plurality of inserts. Inserts proximate the bottom of the body include projections which are positioned under the first and second springs to maintain the body on the base.

19 Claims, 4 Drawing Sheets

U.S. PATENT DOCUMENTS

| | | | |
|---|---|---|---|
| 2005/0178803 A1* | 8/2005 | Barker et al. | 222/465.1 |
| 2006/0016400 A1* | 1/2006 | Rich et al. | 119/57.8 |
| 2006/0156995 A1* | 7/2006 | Ried | 119/484 |
| 2009/0090303 A1* | 4/2009 | Osada et al. | 119/417 |

* cited by examiner ated with increased cortisol, signs of distress, and decreases in testosterone and serum prolactin in various marmoset species.

DEVICE FOR THE SAFE HANDLING OF NONHUMAN PRIMATES

CROSS-REFERENCE TO RELATED APPLICATIONS

The present application claims the benefit of priority of U.S. provisional patent application Ser. No. 60/930,354 filed on May 10, 2007, which is hereby expressly incorporated by reference.

STATEMENT OF GOVERNMENT INTEREST

The invention described herein may be manufactured, used and licensed by or for the United States Government.

BACKGROUND OF THE INVENTION

Small nonhuman primates, frequently the common marmoset (*calithrix jacchus*), are extensively used for biomedical research. Animal research demands an interaction between the animal and research staff, and this often involves capture, retrieval, handling, and transportation. These activities can cause marked changes to measured biological parameters as well as decreases in overall health and well-being of the animal.

Two methods are commonly employed for capture, retrieval, and handling of marmosets. These methods, hand and net capture, raise safety concerns for both animal and handler. Hand capture involves the reach of an individual into the animal's housing cage while wearing thick protective gloves. Such gloves are not typically long enough to cover the entire length of arm protruding into the cage during capture, and while long sleeve garments are indeed available to cover an operator's extended arm in the cage, the potential for any exposure of unprotected skin inside the cage of animals known to have infectious diseases, sharp teeth, and aggressive traits at times is not safe practice. In addition, marmosets typically try to avoid capture by fleeing side to side at the rear or top of the cage or cling tightly to the cage walls. This can cause injuries to themselves or their paired housing mate during removal from their home cage.

Protective gloves, used in both hand and net capture, can inadvertently harm the marmoset. When catching marmosets by hand, the use of heavy, protective gloves (leather gloves or chain-mail gauntlets over leather gloves) has been highly recommended. However, the decrease in tactile sensation for the handler necessitates the weight of the glove used be carefully gauged to ensure that excessive pressure is not applied to the animal, thereby causing injury. The use of heavy, protective gloves to handle marmosets may also result in damage to their teeth if they bite. Prolonged handling with heavy gloves can also cause injury during repositioning of the animal following capture.

Although commonly used, nets for catching marmosets can cause untoward injuries as they engage in typical avoidance responses. A quick sweep of the net at a fleeing marmoset can cause harm from purpura to fracture of long bones (e.g. humerus, femur). The net capture is a frightening and stressful experience which tends to exhaust the marmoset and may result in injury.

Facilities are often recommended to have cages equipped with sliding or false backs, called squeeze-back cages, enabling marmosets to be moved slowly to the front of the cage for administration of medications, injections, and experimental procedures. These cages are easy to use, and effectively immobilize the animal for routine procedures. Squeeze-back cages are not useful for more complicated techniques and can only be used for singly housed marmosets. While safer than hand or net capture, squeeze-back cage capture has been associ Squeeze-back cages are not ideal when they are solely used as the home cage to facilitate restraint and capture because these cages are small, lack enrichment, and perpetuate a constant fear of capture. Another option is for cages to be fitted with a sliding panel in the door to permit the easy transfer of the animal into a transport cage. However, use of sliding panels for smaller transport cages and squeeze-back cages are not universal in all marmoset-research facilities.

The ideal method for gentle capture would be use of a device that minimizes stress, exposure of handler to animal, physical handling and manipulation of the animal, and time to capture. The present invention provides such device.

SUMMARY OF THE INVENTION

A device for the safe handling of nonhuman primates comprises an elongated body having a top end and a bottom end. A lid is connected to the top end and a base is removably connected to the bottom end. Means are provided for separating the bottom end from the base to expose the bottom of the body to allow the nonhuman primate to enter into the body. The body includes a plurality of apertures to allow food for the nonhuman primate to be placed into the body.

The invention will be better understood, and further objects, features and advantages thereof will become more apparent from the following description of the preferred embodiment, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Figure 1A:
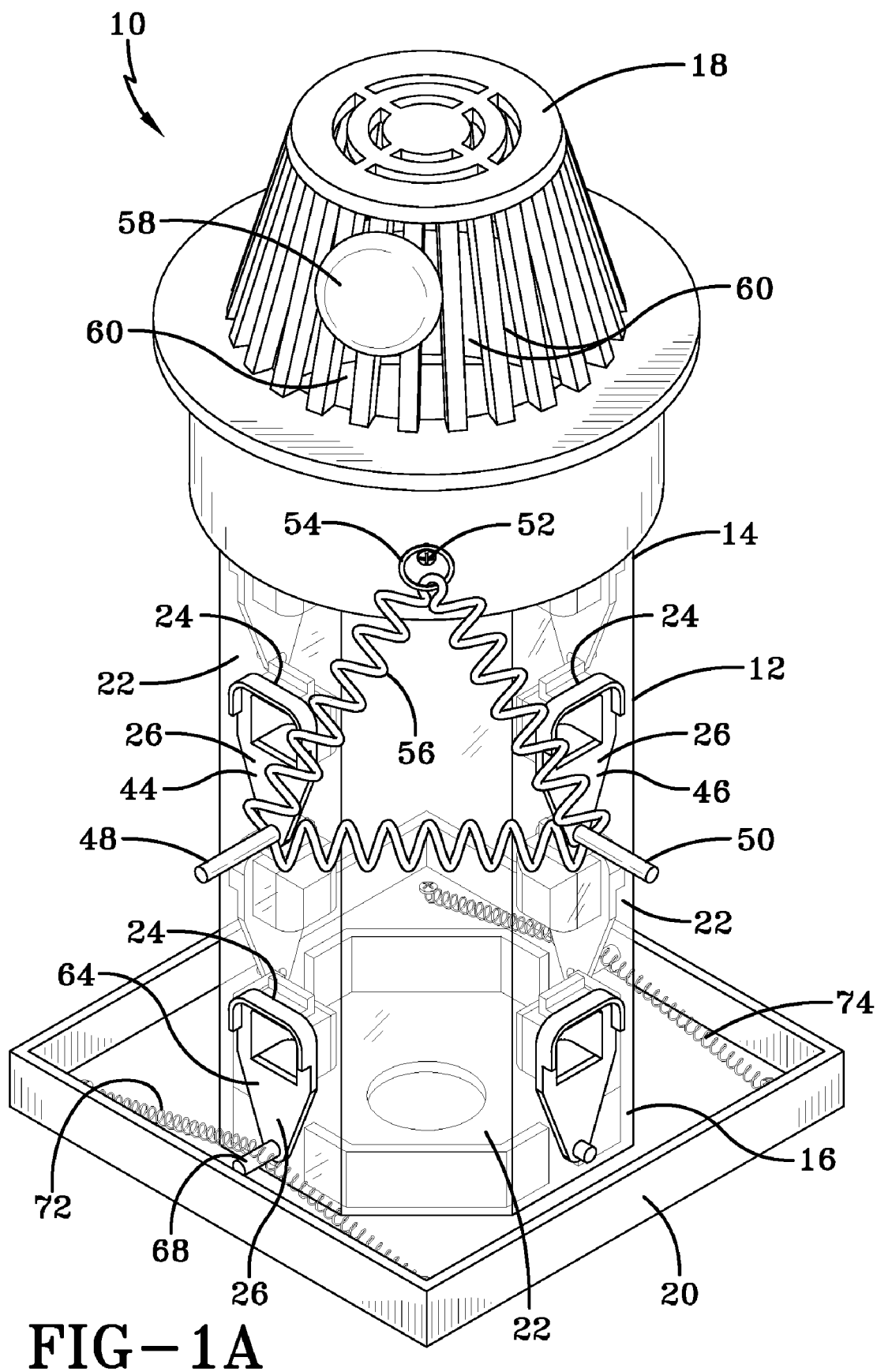
FIG. 1A illustrates a front view of a device in accordance with one embodiment of the present invention.
Figure 1B:
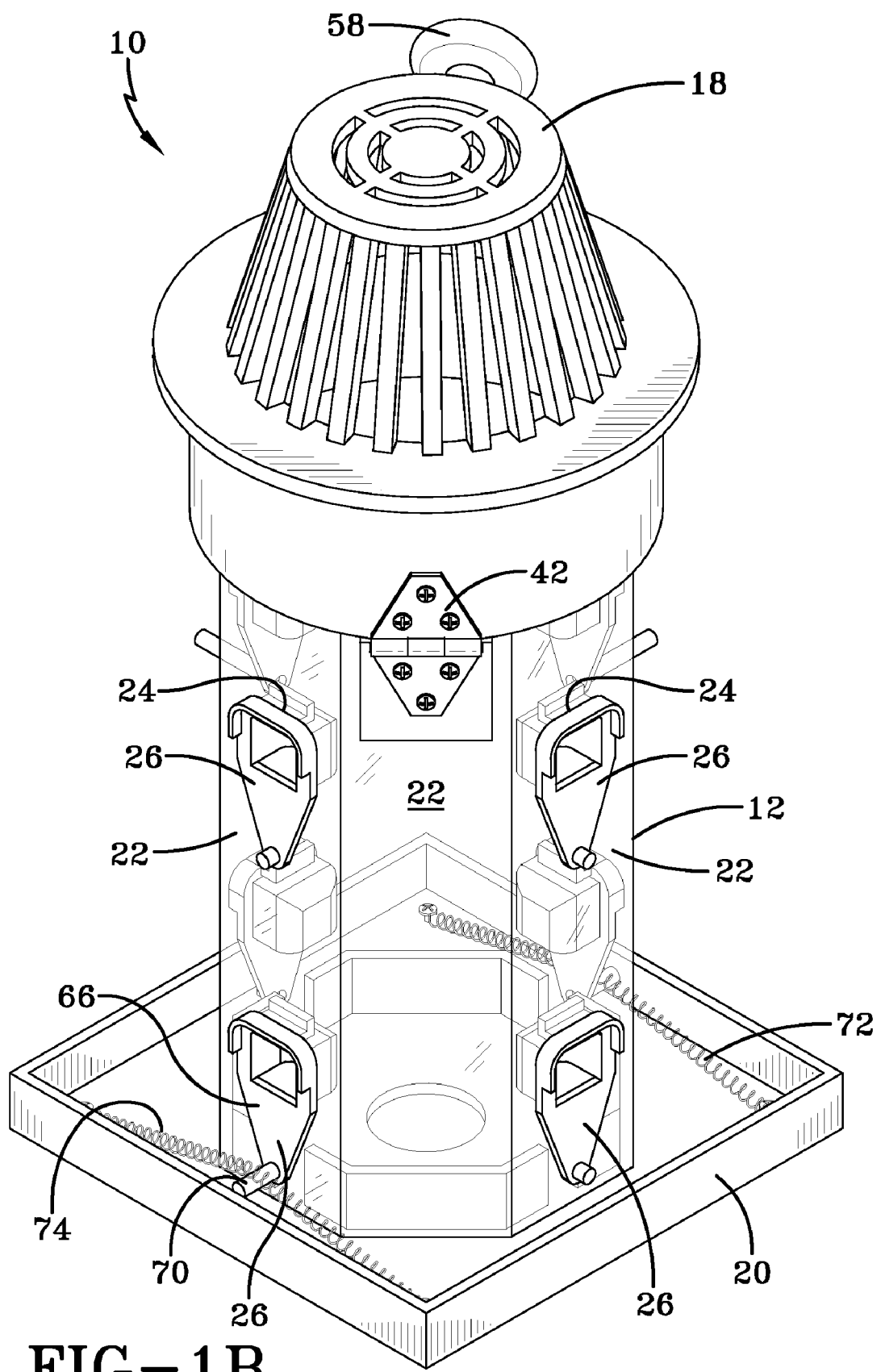
FIG. 1B illustrates a rear view of the device of FIG. 1A.

Although the present invention is described with respect to a marmoset, by way of example, it will be understood that the device is applicable to a variety of nonhuman primates. FIGS. 1A and 1B illustrate respective front and back views of the device 10. Device 10 includes an elongated body 12 having a top end 14 and a bottom end 16. A lid 18 is connected to top end 14 and the bottom end 16 is removably connected to a base 20. Base 20 has a substantially planar bottom surface. In a preferred embodiment, body 12 is of a transparent material, such as plastic, so as to better view an enclosed marmoset.

In FIG. 1A, body 12 is shown as having a plurality of sides 22, specifically eight sides 22. However, body 12 may also have three, four, five, six, seven or more sides 22, or may be cylindrical. The inside transverse dimension (i.e., from side to side) of the body 12 may be in a range of about 5 inches to about 10 inches, depending on the primate. For marmosets, the preferred transverse dimension is about 6 inches. In the case of a cylinder, the inside transverse dimension is the cylinder diameter. The height of device 10, including lid 18, may be in a range of about 14 to about 20 inches. For marmosets, the height is preferably about 16 inches.

Figure 2:
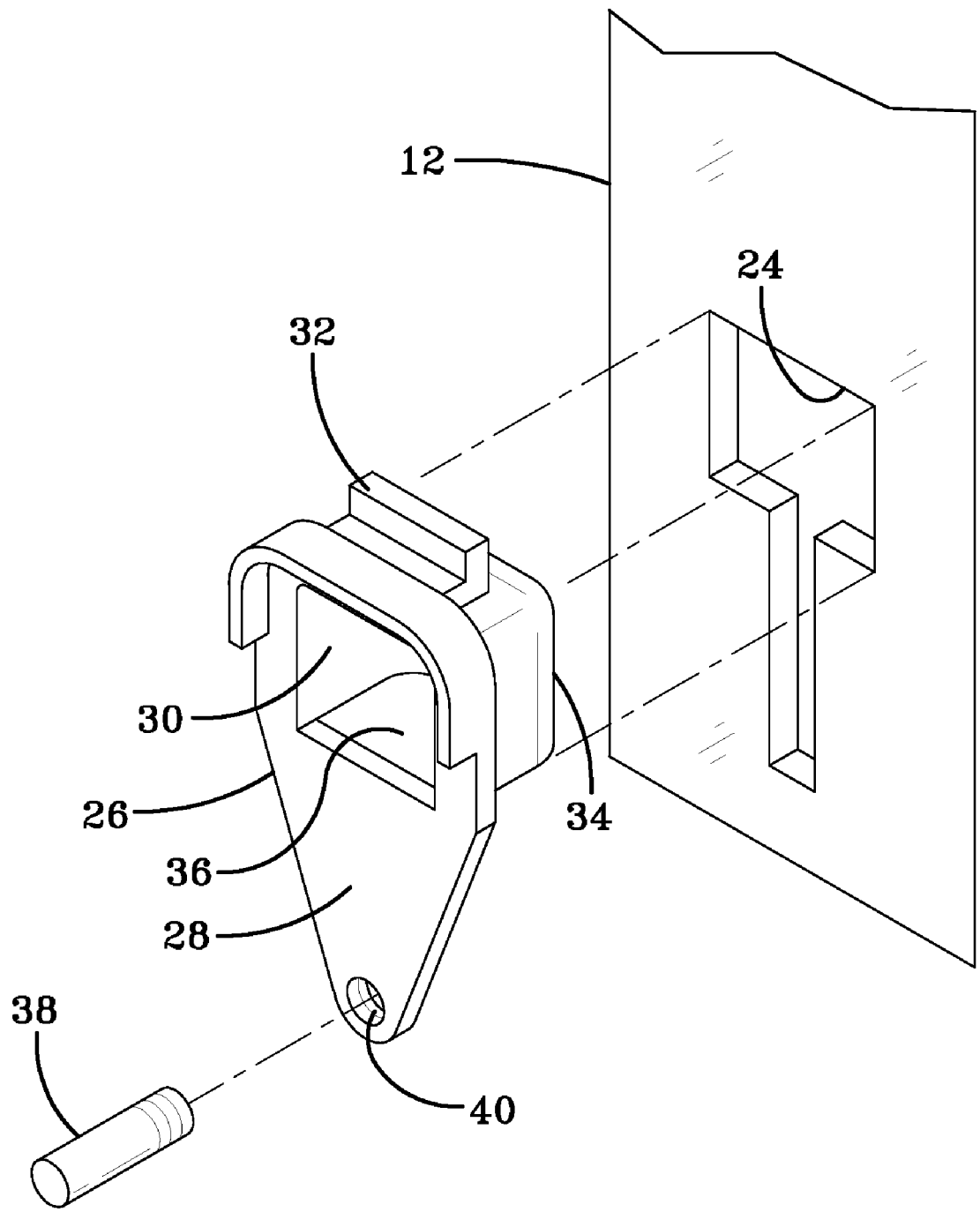
FIG. 2 illustrates an insert used in the device.

Body 12 is provided with multiple apertures 24. Inserts 26 are placed in apertures 24. FIG. 2 shows an exemplary insert 26. The insert 26 includes a front face 28, which lies on the outside of body 12, and an aperture 30. The top of the insert 26 has a lip 32 which lies on the inside of body 12 to secure the insert 26. A back wall 34 extends into body 12 and is devoid of a floor such the arrangement defines a downward facing opening 36 into the body 12 for ventilation, delivery of food morsels, or the like. A projection 38, which may be a screw, is engaged into hole 40 at the bottom of the insert 26.

Referring once again to FIGS. 1A and 1B, FIG. 1B shows that the lid 18 is secured to body 12 by, for example, a hinge 42. The lid is maintained in position by a spring arrangement illustrated in FIG. 1A. More particularly, the spring arrangement includes first and second inserts 44 and 46 having respective projections 48 and 50. Lid 18 includes a projecting screw 52 around which is a ring 54. A spring 56, or the like, is wrapped around projections 48 and 50 of inserts 44 and 46 and is connected to ring 54 so as to maintain lid 18 in a latched or closed condition.

Marmosets have demonstrated a tendency to migrate into lid 18. When a marmoset is to be removed, the lid 18 may be opened by removing the ring 54 from screw 52 and lifting the lid 18 by means of knob 58. Knob 58 is secured to lid 18 through any of openings or slits 60 in lid 18. The marmoset may then be removed from the lid 18 by a handler for injections, blood collection and experimental procedures with minimal stress induced to the animal. In some cases, the marmoset may be accessed through slits or openings 60 in the lid 18, without removing the marmoset from device 10.

To this end, and to encourage the marmoset to migrate to the lid 18, the number and size of the openings 60 in the lid 18 are preferably as large as possible, without comprising structural integrity of the lid. Thus, the lid 18 is more than a planar cover for the top end 14 of the body 12. The lid 18 may define an interior volume and thus may have a height dimension (the height dimension is vertical in FIG. 1A). Lid 18 may preferably have a height in the range of about 3 to about 6 inches, although other heights may be used.

Figure 3:
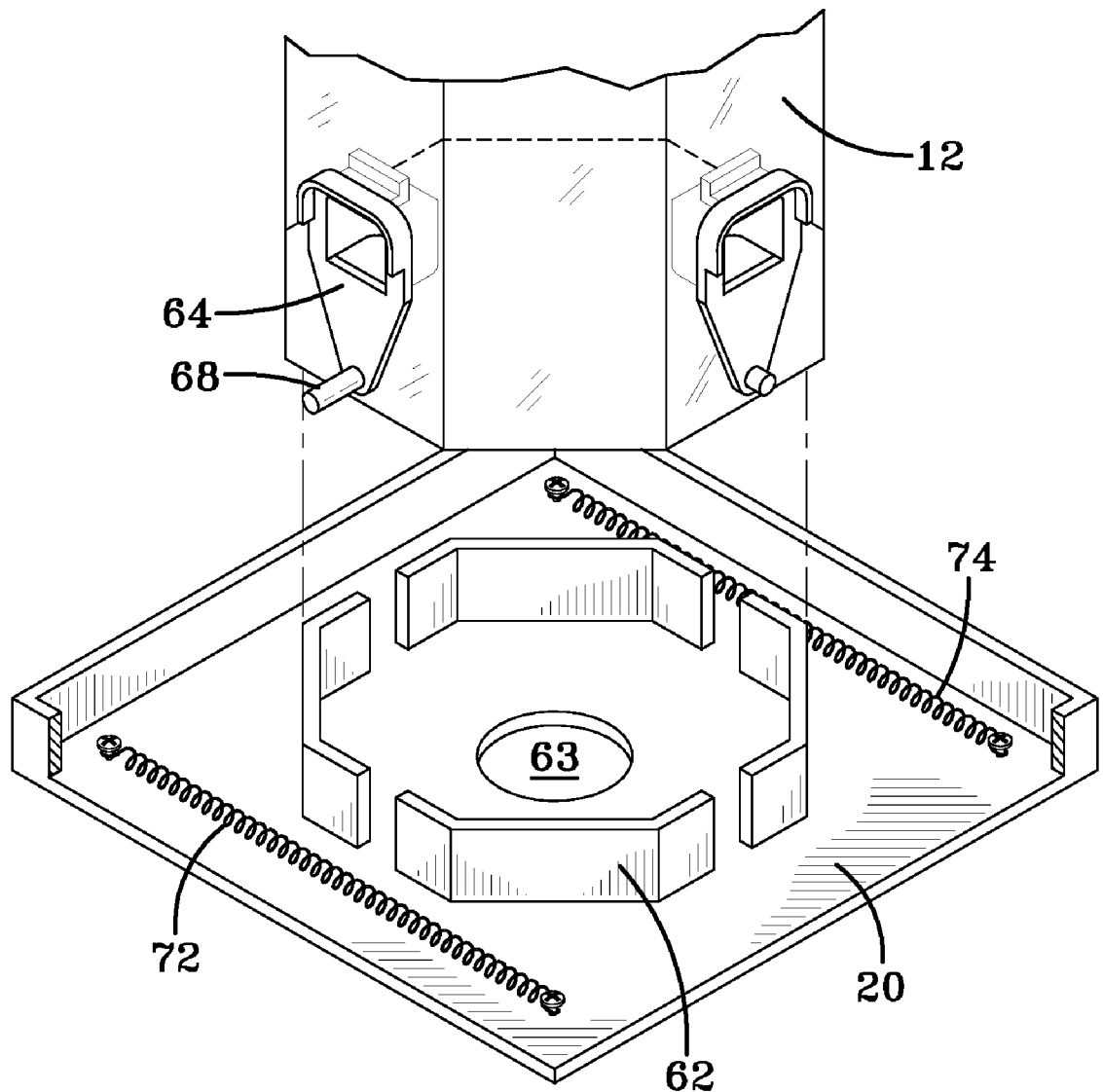
FIG. 3 illustrates the base of the device.

Means are provided to separate the base 20 from the body 12 to enable capture of a marmoset from its cage, for experimental purposes. With additional reference to FIG. 3, the base 20 includes an upstanding segmented wall 62 over which the body 12 fits and which surrounds a central aperture 63. Central aperture 63 is meant for ventilation and not for access by the primate. Thus, central aperture 63 may have a diameter of about an inch or so.

With just a force fit, the body 12 may separate from base 20, so a more positive securing arrangement is provided. The securing arrangement includes third and fourth inserts 64 and 66, proximate the lower end of body 12, and having respective projections 68 and 70. Springs 72 and 74 are secured to base 20 by, for example, screws. To secure body 12 to base 20, projections 68 and 70 are slipped under respective springs 72 and 74, as illustrated in FIGS. 1A and 1B. To remove the base 20, the procedure is reversed.

Marmoset capture involves removal of the base 20 and placement of the device 10 inside of the marmoset's cage (not shown). Food rewards are placed inside the device 10 through apertures 30, for example, to facilitate the learned behavior of entering the device 10. Upon entry of the marmoset into the device 10, the body 12 is clamped onto the base 20 and placed in the upright position. The springs 72, 74 on the base 20 secure the base 20 to the body 12. Once the base 20 is securely attached, the device 10 can be placed on the ground to retrieve the marmoset for veterinary care or manipulation. To maintain stability, the cross-sectional area of base 20 may be at least 1.5 times larger than the cross-sectional area of body 12.

A safe, cost-effective, and improved method for the capture, retrieval, holding and transportation of marmosets and other small nonhuman primates from their holding cages has been described. The device minimizes stress, exposure of handler to animal, physical handling and manipulation of the animal, and time for capture of the animal. The device can use food or other positive reinforcers, create a safe, minimal stress environment for the animal, and encourage cooperative behavior between handler and subject.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A device for the safe handling of nonhuman primates, comprising:
   a base having a substantially planar bottom surface;
   an elongated body having a top end and a bottom end, a cross-sectional area of said base being larger than a cross-sectional area of said body, a transverse dimension of said body being at least about five inches, said body having solid walls;
   a lid connected to said top end of the body with a hinge, said lid including a plurality of openings therein for providing ventilation, said lid having a height greater than one inch and defining an interior volume for containing a nonhuman primate;
   said bottom end being removably connected to said base;
   means for separating said bottom end from said base to allow entrance into said body of said nonhuman primates; said body including a plurality of apertures wherein each of said apertures includes an insert;
   first and second inserts having respective first and second projections extending therefrom;
   a projection member on said lid;
   a ring positioned on said projection member; and
   a spring arrangement wound about said first and second projections and connected to said ring to maintain said lid in a closed condition.

2. A device according to claim 1, wherein said body is made of a substantially transparent material.

3. A device according to claim 1, wherein said body is substantially cylindrical.

4. A device according to claim 1, wherein said body has a plurality of sides.

5. A device according to claim 4, wherein said body has eight sides.

6. A device according to claim 1, further comprising a latching arrangement to maintain said lid on said body.

7. A device according to claim 1, wherein said plurality of openings in said lid comprise a plurality of ventilating slits.

8. A device according to claim 1, wherein said apertures are of a size to allow food for the nonhuman primates to be introduced into said body.

9. A device according to claim 8, wherein each said aperture includes an insert having a back wall which extends into said body and defines a downward facing opening into the body to allow introduction of said food.

10. A device according to claim 1, wherein said base has a central aperture.

11. A device according to claim 10, wherein the central aperture has a diameter of about an inch.

12. A device according to claim 1, wherein the cross-sectional area of said base is at least 1.5 times larger than the cross-sectional area of said body.

13. A device according to claim 1, wherein a height of the device is in a range of about 14 to about 20 inches.

14. A device according to claim 1, wherein the height of the lid is in a range of about 3 to about 6 inches.

15. A device according to claim 1, wherein the base includes an upstanding segmented wall over which the body fits.

16. A device for the safe handling of nonhuman primates, comprising:
   a base having a substantially planar bottom surface;
   an elongated body having a top end and a bottom end, a cross-sectional area of said base being larger than a cross-sectional area of said body, a transverse dimension of said body being at least about five inches, said body having solid walls;
   a lid connected to said top end, said lid including a plurality of openings therein, said lid having a height greater than one inch;
   said bottom end being removably connected to said base;
   means for separating said bottom end from said base to allow entrance into said body of said nonhuman primates;
   said body including a plurality of apertures of a size to allow food for the nonhuman primates to be introduced into said body, each aperture including an insert having a back wall which extends into said body and defines a downward facing opening to allow introduction of said food;
   first and second inserts having respective first and second projections proximate said bottom end of said body; and
   first and second springs adjacent respective first and second sides of said body wherein said first and second projections are respectively positioned under said first and second springs so as to maintain said body on said base.

17. A device for the safe handling of nonhuman primates, comprising:
   a base having a substantially planar bottom surface;
   an elongated body having a top end and a bottom end and a plurality of apertures, said body having solid walls;
   a lid connected to said top end of the body with a hinge, said lid including a plurality of openings therein for providing ventilation, said lid having a height greater than one inch and defining an interior volume for containing a nonhuman primate;
   said bottom end being removably connected to said base;
   first and second inserts disposed in respective apertures and having respective first and second projections extending therefrom;
   a ring connected to said lid;
   a spring wound about said first and second projections and connected to said ring to maintain said lid in a closed condition.

18. The device according to claim 17, further comprising third and fourth inserts disposed in respective apertures and having respective third and fourth projections proximate said bottom end of said body; and
   first and second springs adjacent respective first and second sides of said body wherein said third and fourth projections are respectively positioned under said first and second springs so as to maintain said body on said base.

19. A method, comprising:
   providing the device of claim 1;
   removing the base of the device;
   placing the device inside of a cage for a nonhuman primate; and
   after entry of the nonhuman primate into the device, reattaching the base of the device.

* * * * *